United States Patent [19]

Snyder et al.

[11] 4,117,452
[45] Sep. 26, 1978

[54] TIRE CONDITION SENSING APPARATUS

[75] Inventors: Daniel S. Snyder, Norwalk; Steven O. Luzsicza, Huron; Lyle A. Pauer, Rocky River, all of Ohio

[73] Assignee: Gould Inc., Chicago, Ill.

[21] Appl. No.: 785,018

[22] Filed: Apr. 6, 1977

[51] Int. Cl.$^2$ ............................................. B60C 23/06
[52] U.S. Cl. ................................. 340/58; 200/61.23
[58] Field of Search ............ 340/58; 200/61.22, 61.23, 200/61.25

[56] References Cited

U.S. PATENT DOCUMENTS 3,760,351  9/1973  Thomas ................................. 340/58

FOREIGN PATENT DOCUMENTS 2,528,352  1/1976  Fed. Rep. of Germany.

*Primary Examiner*—Alvin H. Waring
*Attorney, Agent, or Firm*—Russell E. Baumann; Edward E. Sachs

[57] ABSTRACT

Apparatus and method adapted for detecting the profile deflection condition in a wheel structure of the type comprised of a pneumatic tire mounted on a wheel rim and which deflection may be caused by tire under inflation or overloading. A sensing and actuating structure constructed from flexible material having high flex fatigue characteristics to include a body portion and a profile sensor is conveniently mounted to the drop center portion of the rim such that the profile sensor extends into the tire cavity so that it is positively engaged by the inside of the tire wall when tire profile deflection reaches an amount greater than a predetermined maximum amount due to overloading or under inflation, to thereby cause flexure in the profile sensor generally inwardly toward the rim. This flexure causes a piezoelectric device positioned adjacent the profile sensor to provide an electrical discharge. This electrical discharge is electrically interconnected to the radio transmitter for selectively causing energization thereof. The radio signal thus selectively transmitted is received by a receiving unit spaced remote from the wheel to cause energization of convenient indicating means located within the vehicle itself for showing that tire deflection greater than a predetermined maximum amount has been detected.

7 Claims, 11 Drawing Figures

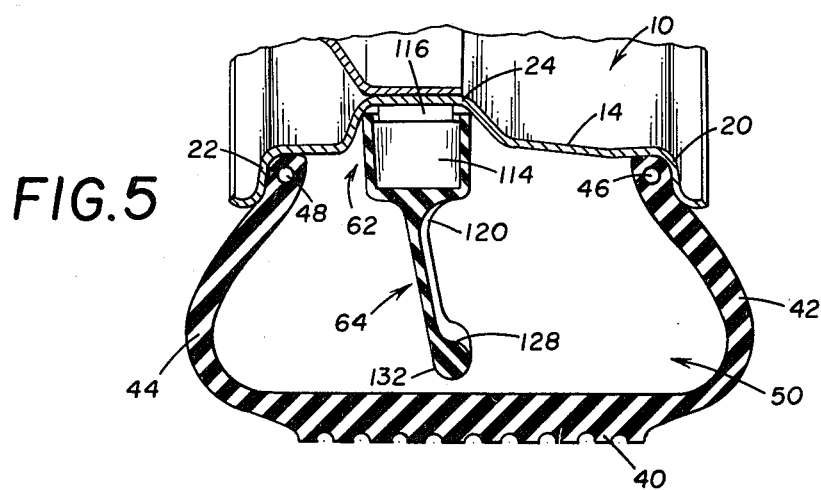
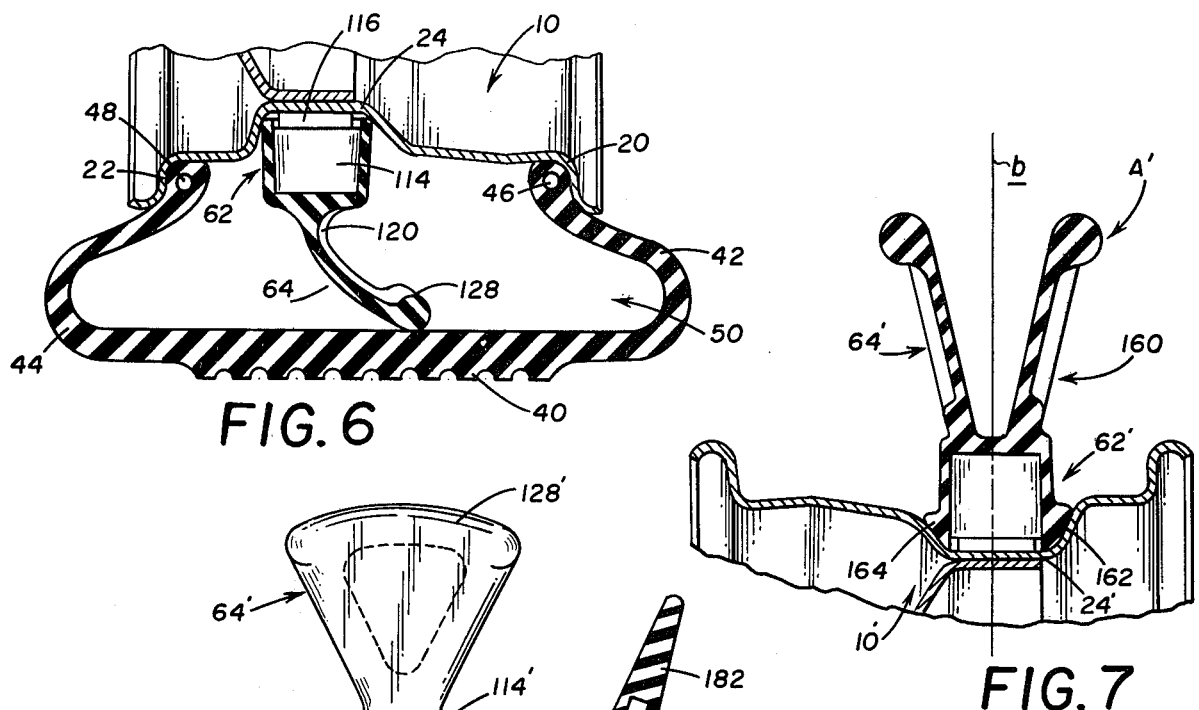
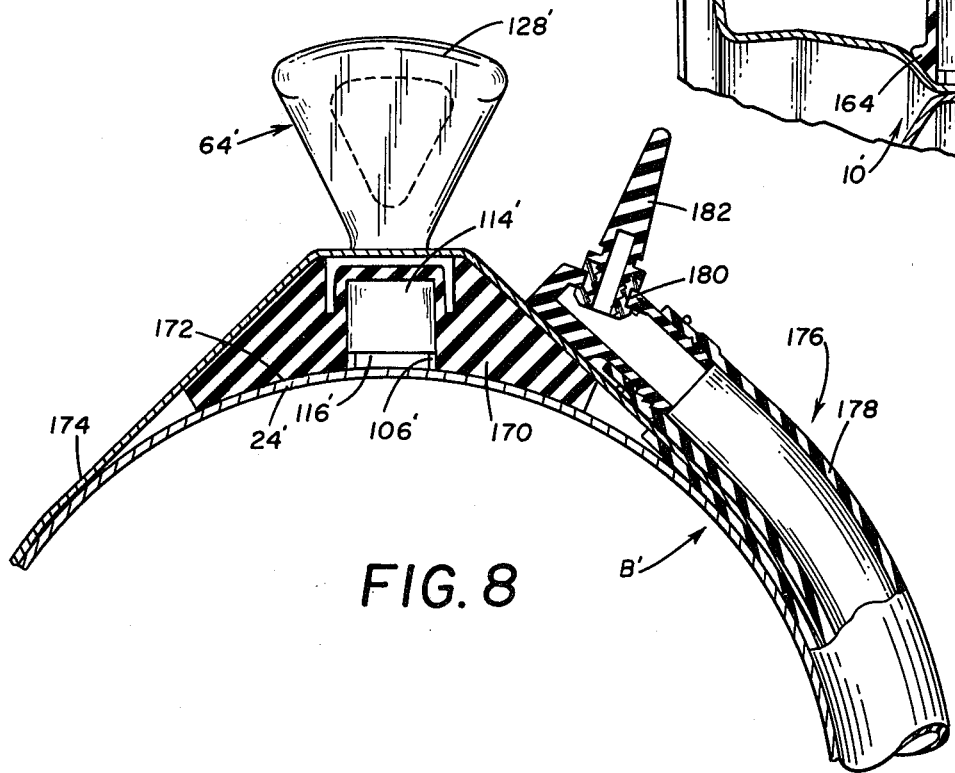

TIRE CONDITION SENSING APPARATUS

BACKGROUND OF THE INVENTION

This invention pertains to the art of detecting and reporting devices and more particularly to method and apparatus for detecting and reporting some predetermined condition in a load bearing body.

The invention is particularly applicable to detecting a profile deflection greater than a maximum allowable amount in pneumatic vehicle tires and will be described with particular reference thereto. However, it should be appreciated by those skilled in the art that the invention has far broader applications and may be utilized in many other environments where it is desired to detect and report or indicate some predetermined profile deflection condition in a load bearing body.

Both overloading and under inflated conditions for pneumatic tires is a cause for excessive tire wear resulting in premature tire failure. Moreover, such overloading and/or under inflated tire conditions can have an adverse effect on the efficiency of operation of the vehicle as to both vehicle preformance and handling as well as vehicle gas mileage. Since such conditions and results have been well known for quite some time, there have been many attempts to develop and provide means for automatically detecting and reporting at least under and/or over inflation conditions. Recently, development efforts for a practical and inexpensive device for detecting tire conditions have become more concentrated due to the rise in fuel and tire costs as well as vehicle operation costs in general.

While there have been quite a number of prior devices developed and utilized for detecting tire inflation conditions, substantially all of these tire devices have had structural or operational shortcomings rendering them undesirable or impractical for widespread use. While these specific prior devices have been many and varied, most have required special wiring and the like extending from the wheel assemblies to the vehicle chassis and then through the vehicle body to the instrument panel. Such wiring adds undesired costs to the system and, moreover, is extremely difficult and time consuming to install. Such installation time is particularly important when considered both on the basis of installing the devices during original vehicle assembly for making them a part of the original vehicle equipment as well as retrofitting them. Further, the necessary special wiring and associated equipment extending between the wheels and chassis are such that they are susceptible to damage or breakage from road materials, weathering and the like encountered during normal vehicle use.

Some prior devices have attempted to overcome the aforementioned wiring problems by utilizing self contained units disposed at each wheel and which include small signal emitters such as radio transmitters. These emitters are energized to transmit a signal in response to the detection of some out of order tire condition and this signal is received in the vehicle to energize a convenient indicator device to advise the vehicle operator that an out of order tire condition is present. Such devices have utilized small batteries for providing a source of selective energization for the emitters. The problem encountered here is that batteries have an uncertain shelf and useful life and must be replaced from time to time. Since it is generally impossible to know when replacement is required, these prior devices have not proved to be reliable.

A still further and more important problem with apparatus and devices for detecting over and/or under inflated conditions in pneumatic vehicle tires is that the inflated condition is not always a true or accurate measure of actual tire condition. That is, a tire may be inflated to a pressure which is wholly within the tire manufacturer's specifications but, due to the load a particular vehicle may be carrying, the tire profile may be deflected to an unacceptable condition as prescribed by the manufacturer's specifications. One vehicle application where this situation could frequently arise would be in station wagon or truck type vehicles where the cargo portion of the vehicle was substantially loaded with heavy articles or equipment for transport from one point to another. Here, and while tire inflation or pressure may be proper, the profile deflection caused by the overloading is greater than the maximum allowable deflection so as to cause possible tire damage and/or vehicle handling problems.

In some overloading situations, it is possible to increase the tire inflation pressure to the maximum amount prescribed by the manufacturer's specifications with this increase in pressure acting so sufficiently reduce the amount of profile deflection so that it falls within acceptable limits. In heavy overloading conditions, however, such an increase in tire pressure will not reduce the profile deflection enough to bring it within acceptable limits so that a dangerous tire condition would still exist. Here, again, prior tire inflation sensing devices would only detect the fact that tire pressure was within allowable limits thereby giving the vehicle operator a false sense of security not only as to tire conditions, but also as to the handling and maneuverability of the vehicle.

As a result of the above noted problems encountered with prior inflation detecting equipment and the shortcomings of such devices insofar as the tire conditions which they actually monitor and/or detect, it has been desirable to develop apparatus and method which would sense tire profile conditions to thereby provide a better indication of both tire overloading and/or under inflation. Such method and apparatus should be self-contained, include no special wiring or associated equipment extending between the vehicle wheels and chassis, be simple and easy to install on a high vehicle production basis, have a long useful life, not require use of short lived power means such as batteries or the like, and be bi-directional, i.e., operate in both directions of wheel rotation.

The present invention contemplates new and improved apparatus and method which overcome all of the above referred to problems and others as well as meeting the above noted design criteria to provide a profile sensing device and method for hollow bodies. While the concepts of this apparatus and method are described with particular reference to implementation on a conventional vehicle wheel assembly, the inventive concepts are deemed to be readily adapted to use for any number of profile sensing functions for a hollow body in any number of environments.

BRIEF DESCRIPTION OF THE INVENTION

In accordance with the present invention, there is provided apparatus for detecting a preselected profile condition or deflection for a load bearing body. This apparatus is comprised of a sensing device having a mechanical linkage or profile sensor which is positioned in an operative relationship with the body itself. The linkage has a first normal position spaced from the body when the body has less than a predetermined maximum allowable deflection and a second position when the body has greater than this predetermined maximum. The linkage is forcibly moved from the first toward the second position by positive contact from the body thereby causing a reaction in the sensing device. Energizing means are operably associated with the sensing device and selectively movable between non-energized and energized conditions. The energizing means is in a non-energized condition when the linkage is in the first position and moved to an energized condition in response to movement of the linkage to the second position. Means responsive to the energizing means are also provided for indicating that the profile of the body is deflected greater than the predetermined allowable maximum.

In accordance with another aspect of the present invention, the body comprises a hollow body and the sensing device is mounted to the mounting member with the linkage extending toward the body whereby the linkage may be positively engaged by a wall of the hollow body when deflection thereof is greater than the predetermined maximum.

In accordance with another aspect of the present invention, the sensing device is adapted to be mounted within the confines of the hollow body and includes a body portion having a mounting surface adapted to be received against the mounting member. The linkage comprises a profile sensor protruding outwardly of the body on generally the other side thereof from the mounting surface toward the cavity defined by the hollow body and both the profile sensor and body portion are constructed from a flexible material.

In accordance with a still further aspect of the present invention, the energizing means comprises a piezoelectric generator and the indicating means comprises a radio transmitter.

In accordance with still another aspect of the present invention, the transmitter and piezoelectric generator are received in a cavity extending inwardly from the sensing device body portion mounting surface and movement of the profile sensor from the first to the second position causes the sensing device body portion to be moved toward close forced contact with the mounting member and thereby cause the piezoelectric generator to electrically discharge.

In accordance with a more specific aspect of the present invention, the apparatus is adapted to be moved in operative associated with a conventional vehicle wheel assembly arrangement for monitoring the profile condition of the pneumatic tire and sense an over-profiled condition caused by overloading and/or under inflation.

According to a still further aspect of the present invention, there is provided a method of detecting a predetermined amount of profile deflection in a load bearing body. The method comprises the steps of: mounting a sensing device having a mechanical linkage portion such that the linkage is placed in operative association with the body; establishing a first normal position for the linkage when the profile of the body is deflected within predetermined acceptable limits during body loading; allowing forcing contact between the body and the linkage when the body profile is deflected beyond the predetermined limits thereby forcing the linkage to a second position; activating energizing means in response to movement of the linkage from the first to the second position; and, causing indicating means operably connected to the energizing means to indicate that the profile deflection of the hollow body is greater than the predetermined limits.

According to still another aspect of the present invention, the method includes repeating the step of activating a preselected plurality of times prior to the step of causing.

In accordance with yet a further more limited and specific aspect of the present invention, the body comprises a vehicle tire and the mounting member comprises a rim with the step of mounting comprising fixedly mounting the sensing device to the outer peripheral surface of the rim within the confines of the tire cavity and the step of allowing occurring when the tire has a profile deflection greater than a predetermined acceptable amount.

The principal object of the present invention is the provision of a new apparatus and method for indicating a predetermined profile condition in a load bearing body.

Another object of the present invention is the provision of apparatus and method for indicating a profile condition for a load bearing body which are simple in design, construction, installation and operation.

Another object of the present invention is the provision of a fully self-contained apparatus and method for indicating a profile condition for a load bearing body.

Still another object of the present invention is the provision of apparatus and method for indicating a profile condition for a body which are readily adapted to use in many different types of hollow bodies in many different environments.

BRIEF DESCRIPTION OF THE DRAWINGS

The invention may take physical form in certain parts and arrangements of parts, preferred and alternative embodiment of which will be described in detail in this specification and illustrated in the accompanying drawings which form a part hereof and wherein:

FIG. 5 is a cross-sectional view similar to FIG. 2 showing a normal profile condition for the vehicle tire;

FIG. 6 is a cross-sectional view similar to FIGS. 3 and 5 showing an over-profiled condition for the vehicle tire with the device of the subject invention being engaged by the tire;

FIG. 7 is a cross-sectional view showing a slightly modified form for the device of the subject invention;

FIG. 8 is a side elevational view in partial cross-section showing another modified form for the device of the subject invention.

DESCRIPTION OF THE PREFERRED EMBODIMENT

Figure 1:
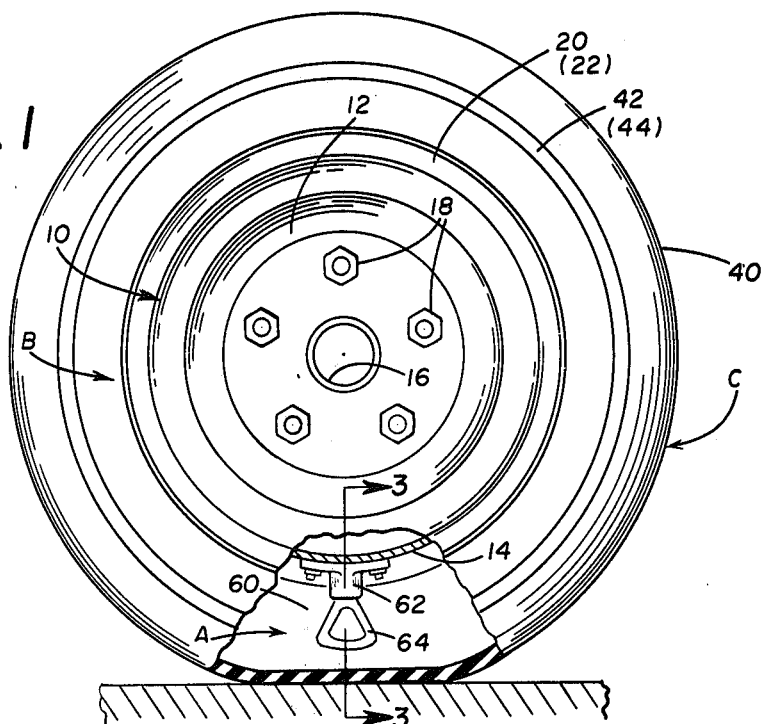
FIG. 1 is a side elevational view in partial cross-section of a conventional vehicle wheel assembly having the device or apparatus of the present invention installed thereon.

Referring now to the drawings wherein the showings are for purposes of illustrating a preferred and alternative embodiments of the invention only and not for purposes of limiting same, the FIGURES show a profile sensing device A fixedly mounted to a vehicle wheel assembly comprised of a rim B and a pneumatic tire C. A portion of the tire has been broken away in FIG. 1 for ease of illustrating the preferred embodiment in which the device and method of the subject invention are employed. While this preferred environment as described in detail hereinafter comprises detecting and indicating profile deflection for vehicle tires, the concepts of the invention are deemed equally useful and applicable to other load bearing bodies and environments for detecting profile deflection.

More particularly and with reference to FIGS. 1-4, rim B is comprised of an annular body 10 having a center area 12 and an outer peripheral surface or wall 14. A center opening 16 in center area 12 includes a plurality of openings spaced therearound which are utilized to receive mounting studs which, in turn, receive lug nuts 18 for mounting the rim to a vehicle as is well known. At the side edges of outer peripheral surface 14 are circumferential rim flanges 20,22 for retaining the pneumatic tire in position on the rim as is also conventional. Further, outer peripheral surface or wall 14 includes an inwardly extending circumferential drop center area 24 which is typical in conventional wheel assembly rims.

Figure 3:
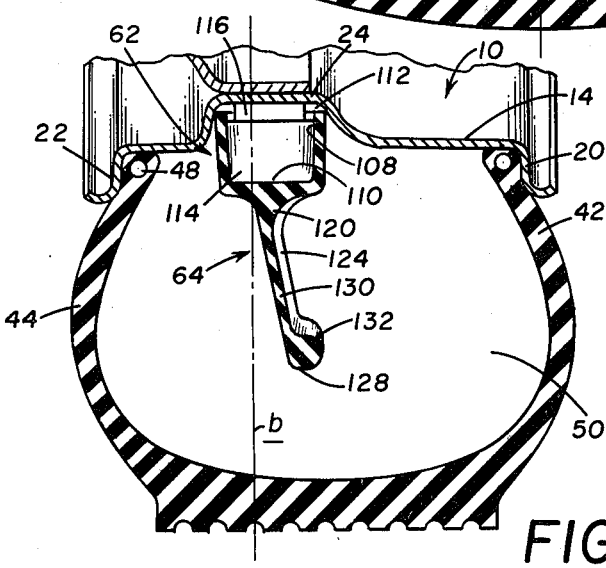
FIG. 3 is a cross-sectional view taken along lines 3—3 of FIG. 1 with the vehicle tire shown in a no-load condition.

Pneumatic tire C comprises a conventional tire having a road engaging tread surface generally designated 40 and opposed side walls 42,44 terminating in tire bead areas 46,48 respectively. As best seen in FIG. 3, bead areas 46,48 are received inside rim flanges 20,22 as is conventional.

Figure 2:
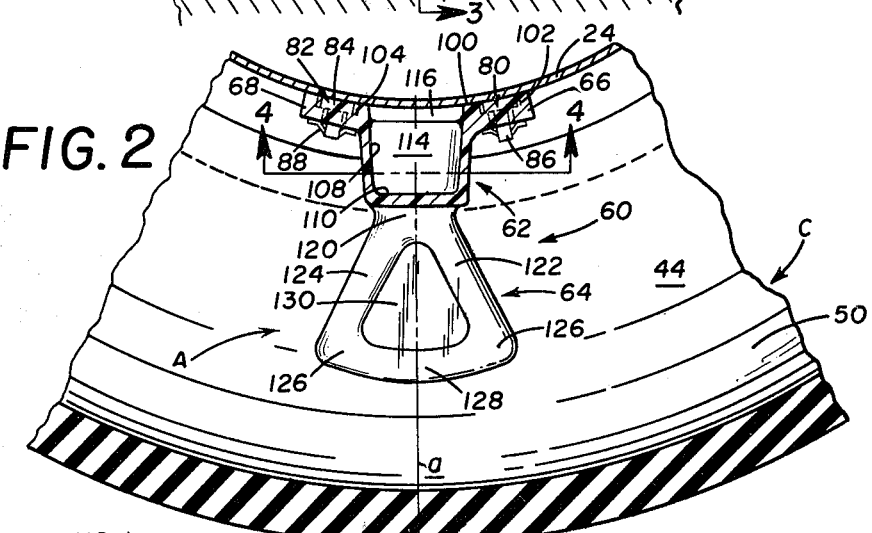
FIG. 2 is an enlarged side elevational view in partial cross-section of the device shown in FIG. 1, with the vehicle tire shown in a no-load condition.
Figure 4:
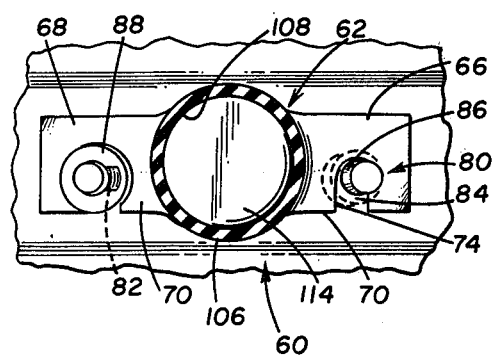
FIG. 4 is a cross-sectional view taken along lines 4—4 of FIG. 2.

The primary focus of the subject invention is on profile sensing device A which is best shown in detail in FIGS. 2, 3 and 4. This device comprises a sensing and actuating structure generally designated 60 having a body portion 62 and a mechanical linkage or profile sensor 64. Extending outward from body portion 62 are a pair of opposed mounting flanges 66,68. Extending inwardly from each side edge 70 of mounting flanges 66,68 is a generally U-shaped mounting groove or opening 74. Due to the specific operation and use of profile sensing device A, the sensing and actuating structure 60 is preferably constructed of a high grade elastomeric compound having high flex fatigue characteristics and rubber or rubber-like materials are preferred, although many other flexible and rigid materials could also be used in practicing the broadest inventive concepts involved. Moreover, sensing and actuating structure 60, including body portion 62, profile sensor 64 and mounting flanges 66,68 may be conventionally integrally molded with each other. It should be particularly appreciated that profile sensor 64 could take may other forms and shapes of mechanical linkages than those specifically disclosed hereinafter without in any way departing from the overall intent or scope of the present invention.

In the preferred arrangement of the device, sensing and actuating structure 60 is mounted to rim outer peripheral surface or wall 14 in drop center area 24 by means of a pair of weld pins generally designated 80,82 spaced apart so as to be received in the mounting grooves or opening 74 of each mounting flange 66,68. Each of these pins includes a slightly enlarged base portion 84 rigidly affixed to the drop center area and a mounting shaft 86 extending outwardly thereof generally radially of the rim. The weld pin type of mounting arrangement is preferred since it is not only simple and inexpensive, but readily adapted to installation on the rim by high production techniques and methods. Conventional caps or nuts generally designated 88 are received over the outermost ends of weld pin mounting shafts 86 in order to retain the sensing and actuating structure 60 in position. The cap or nut associated with weld pin 80 has been removed for ease of illustration in FIG. 4 and as shown in the drawings, a Tinnerman type of fastener is employed. As best shown in both FIGS. 3 and 4, body portion 62 is dimensioned to be fairly closely received between the side walls of drop center area 24.

It should also be noted that many other arrangements may be alternatively employed for mounting sensing and actuating structure 60 to rim outer peripheral surface 14. Among these are, for example, conventional nut and bolt arrangements, retaining bands and the like. However, the weld pin arrangement described hereinabove and shown in the drawings is preferred because of their simplistic nature and speed with which the pins may be installed on the rim in a high production type of environment. In addition, counterbalancing weights (not shown) may be conveniently mounted to the rim generally opposite from profile sensing device A. These weights are employed to offset the weight of device A for eliminating an out of balance condition which would otherwise exist. Since these weights do not form a part of the present invention, they are not shown in the drawings or described further herein.

The lowermost surface of body portion 62 defines a mounting surface 100 (FIG. 2) and includes the lowermost surface of mounting flanges 66,68. This mounting surface includes recessed areas 102, 104 for purposes of receiving base portions 84 of weld pins 80,82 respectively. Extending inwardly from mounting surface 100 at body portion 62 is a generally circular cavity generally designated 106. This cavity includes a continuous side wall 108 and an innermost end wall 110. Cavity 106 also includes a slightly inwardly recessed area 112, (FIG. 3) which aids in facilitating the appropriate interaction between body portion 62 and the rim during device operation as will be described hereinafter.

A radio transmitter package generally designated 114 and a piezoelectric generator or package generally designated 116 are received within cavity 106. The radio transmitter is only schematically shown and identified by numeral 114 as the particulars of the transmitter and circuitry therefore do not form a specific part of the present invention. Many types of already known circuits and transmitters could be advantageously utilized in practicing the broadest concepts of the present invention. Likewise, piezoelectric generator 116 is only schematically shown since there are many different types and styles of such devices which could be advantageously employed when practicing the concepts of the subject invention. However, and in the preferred embodiment here under discussion, thin or disc-like piezoelectric generator of the type commonly referred to as a unimorph crystal device is preferred. This unimorph crystal device is designed so that during flexure thereof in a manner described hereinafter, an electrical impulse is discharged and that impulse then transferred to the circuitry for radio transmitter 114 to operate the radio. Here, again, the precise nature of this interconnection does not form a part of the present invention so that the specifics thereof are not described in detail herein. It is deemed to be within the realm of one skilled in the art of electronics to be able to make this particular interconnection by means of several alternative arrangements. Additionally desired characteristics for transmitter 114 and piezoelectric generator 116 will be discussed in some greater detail hereinafter with reference to installed operation of profile sensing device A.

Profile sensor 64 is connected to body portion 62 of sensing and actuating structure 60 by means of an operating juncture generally designated 120 in FIGS. 2 and 3. The profile sensor is comprised of a pair of leg-like members generally designated 122,124 which diverge outwardly of each other from junction area 120 with each leg terminating in an outer end generally designated 126. A generally arcuate shaped rib or connecting member 128 extends outer ends 126 of legs 122,124. A centrally disposed generally triangular web area 130 is included between the two legs and the arcuate shaped rib or connecting member. As best shown in FIG. 3, the thickness of legs 122,124 and arcuate shaped rib or connecting member 128 is greater than the thickness of the generally triangular shaped web area 130. Moreover, at least the arcuate shaped rib or connecting member has a generally bulbuous shaped area 132 which is greater in thickness than the thickness of legs 122,124. The greater thickness of bulbuous shaped area 130 is primarily provided for purposes of strengthening the area of the profile sensor contacted by the tire during device operation as will be described hereinafter.

With reference to FIG. 2 and the preferred embodiment of the present invention, legs 122,124 diverge outwardly from operating junction 120 at approximately an angle of 55° relative to each other. While this particular relationship is deemed preferred, many other relative angles could also be advantageously employed.

It will be further seen from this FIGURE that legs 122,124 are equal distantly or symmetrically disposed relative to a plane extending longitudinally of rim B and radially outwardly therefrom through body portion 62. An end view of such a plane is schematically shown and identified by letter a. The primary reason for this symmetrical disposition is to facilitate bi-directional operation of profile sensing device A when it is installed on a conventional wheel assembly.

With reference to the cross-sectional view of FIG. 3, it will be seen that the plane of profile sensor 64 as defined by legs 122,124, arcuate shaped rib or connecting member 128 and central area 130 is angularly disposed relative to a plane extending transversely through rim B and outwardly thereof through body portion 62. An end view of this plane is schematically shown by line b in FIG. 3. That is, plane b in FIG. 3 is a plane through the wheel assembly perpendicular to the axis of rotation. While the preferred angle of the disposition of the plane thus defined by profile sensor 64 relative to plane b is approximately 11°, other angles could also be advantageously employed. The primary purpose for including such an angular disposition is to make certain that the profile sensor is deflected rather than simply being compressed during device operation. This feature and the reasons therefore will become more readily apparent hereinafter.

With the profile sensing device A mounted to rim B as hereinabove described and with pneumatic tire C conventionally mounted to the rim so as to form a wheel assembly, attention is specifically invited to FIGS. 3, 5 and 6 for a description of the operation thereof. In FIG. 3, with pneumatic tire C inflated to a pressure within the manufacturer's prescribed pressure limits and with no load exerted on the tire, profile of the tire assumes a non-deflected condition wherein the outermost portion of arcuate shaped rib or connecting member 128 as defined by bulbuous area 132 is spaced some distance from the inside walls of the tire and is in a first normal position. The no-load condition for the tire is where the tire is properly inflated but installed on a vehicle for supporting the weight thereof.

FIG. 5 is a view similar to FIG. 3 showing the tire under normally loaded conditions wherein the tire is deflected somewhat within the manufacturer's specifications in response to supporting a load. The amount of deflection typically allowed includes a range between some minimum and maximum amount and in practical application, this deflection will be varied somewhat within this range in accordance with actual vehicle load and the tire inflation conditions. In some instances where the profile deflection is greater than the maximum allowable amount due to vehicle overloading, an increase in tire inflation pressure due to the maximum as determined by the manufacturer's specifications may be sufficient to cause a corresponding reduction in the amount of tire deflection to thereby bring the deflection within allowable limits. As shown in FIG. 5 and with the tire deflected within allowable limits, connecting member 128 is still spaced from the inner walls of the tire. It should also be here noted that in typical tire deflection conditions, road engaging tread surface 40 is slightly flattened and side walls 42, 44 are biased arcuately outward. Moreover, the maximum deflection under any inflation or loading conditions will be at that portion of the tire which at any precise moment in time is in actual engagement with the road surface so that the precise location of the deflection continuously varies as the wheel assembly is rotated.

FIG. 6 is a cross-sectional view similar to FIGS. 3 and 5 showing the pneumatic tire as having a profile deflection greater than a predetermined maximum or safe amount. With this over-profiled or deflected condition, the inner wall of road engaging tread surface 40 positively engages arcuate shaped rib or connecting member 128 at the bulbuous area 132 to force profile sensor 64 from the first normally unflexed position as shown in FIGS. 3 and 5 to a second flexed position as shown in FIG. 6. The profile sensor will be cyclically moved into and out of this flexed position, that is, between the first and second positions during each revolution of the vehicle wheel. Thus, profile sensor 64 is desirably constructed from a high grade elastomeric material having high flex fatigue characteristics. The angular disposition of the plane of profile sensor 64 assures that the profile sensor will be accurately moved between the first and second positions and not simply compressed or squashed during engagement by the tire.

When the profile sensor is moved or flexed to the second position as shown in FIG. 6, a corresponding flexure is carried forward into body portion 62 through operating junction area 120 to thereby force the body portion toward close forced engagement with rim drop center area 24. Movement of body portion 62 so as to direct mounting surface 100 into close forced contact with drop center area 24 causes radio transmitter 114 and piezoelectric generator 116 disposed in cavity 106 to also be directed toward the drop center area. The piezoelectric device is designed so that this movement will cause a flexure therein generating an electrical discharge therefrom. As described above, this such deflection may also occur if the vehicle is simply overloaded. Changes to the dimensional characteristics of profile sensor 64 may be made as desired in order to sense a greater or lesser amount of deflection.

When piezoelectric generator 116 is energized as described above, the electrical discharge is carried to the circuitry for radio transmitter generally designated 114. Discharge causes energization of the radio transmitter through its circuitry to emit a radio signal through a wire antenna arrangement (not shown) which may be conveniently mounted to the rim at, for example, rim drop center area 24. A high frequency signal such as a frequency modulated (FM) signal is preferred from the transmitter to eliminate any problems with noise and interference generally associated with lower frequency radio signals. However, amplitude modulated (AM) signals could also be used and in some instances it would be possible to entirely eliminate the wire or other antenna arrangements. Many alternative circuitry arrangements could be equally and adequately employed and, in fact, means other than a radio transmitter could also be employed to indicate an out of order tire profile condition in response to energization by piezoelectric generator 116.

Figure 11:
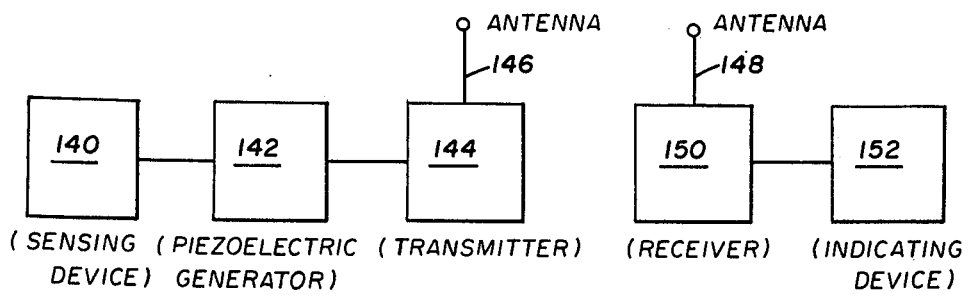

FIG. 11 shows a schematic view of the basic components of the subject invention as they relate to each other and to a receiver disposed in the vehicle itself. New numerals have been employed for the components schematically shown for ease of illustration and description. In this FIGURE, the profile sensor of profile sensing device 140 senses tire profile deflection below a predetermined maximum and is flexed from the first normal position to a second position thereby causing flexure in piezoelectric generator 142 so that an electrical impulse is generated. This impulse is connected to the circuitry for radio transmitter 144 and when so energized, transmitter 144 transmits a radio signal through antenna 146.

The signal emitted from antenna 146 is then picked up by antenna 148 in a receiving unit 150 located in the vehicle. That signal is then decoded or otherwise used to energize a warning light or some other device in or adjacent the vehicle instrument panel for indicating that a tire has a profile deflection greater than a predetermined maximum amount. The specifics of receiver 150 and indicating device 152 do not form a part of the present invention and, therefore, are not described in greater detail herein. Such receiving devices are, however, known in the art and generally compatible with conventional radio receiving technology.

If the transmitter were to be energized each time that the piezoelectric device was flexed, many false readings of an out of order tire condition would be received through indicator 152. Each time profile sensing device A is in or adjacent the 6 o'clock position as viewed in FIG. 1 and the wheel simultaneously hits a bump, pothole or the like, a temporary over-deflected tire condition may be caused thereby activating profile sensing device A such that radio transmitter 114 would emit a signal which would ultimately be reflected by indicating device 152 at the vehicle instrument panel. Since this over-profiled condition is simply a temporary one normally caused by road conditions, the driver or operator of the vehicle could be led into believing that some out of order condition requiring immediate maintenance attention was present.

Accordingly, and in order to overcome this particular problem, it is possible to include additional circuitry for radio transmitter 114 so that a plurality of consecutive flexures of piezoelectric device 116 are required prior to transmitter energization. This then eliminates false readings which would otherwise be present as discussed above. It has been found that providing storage circuitry allowing for the storage of electrical discharges from generator 116 caused by approximately 40 separate revolutions of the wheel resulting in 40 separate flexures of the generator when the tire profile deflection is greater than the predetermined maximum prior to energization of the transmitter will suffice to eliminate these false reading problems. Other modifications could also be adapted to the radio transmitter and piezoelectric generator arrangement for solving this same problem without in any way departing from the overall intent or scope of the present invention.

FIGS. 7–10 show various modifications to the preferred profile sensing device A structure as hereinabove described in detail. For ease of reference and illustration, like components are identified by like numerals with a primed suffix (') and new components are identified by new numerals.

FIG. 7 shows profile sensing device A' as having a pair of identical and oppositely disposed profile sensors 64', 160. These are substantially identical to profile sensor 64 hereinabove described in detail and are symmetrically disposed about the plane identified as b' in that FIGURE. This arrangement merely provides for equalization of force applied against body portion 62' when the inside of the tire engages sensors 64', 160 in response to an over-profiled tire condition. Moreover, sidewall surfaces 162, 164 of sensing and actuating structure body portion 62' are dimensioned and configured so as to be closely received between and mate with the side walls of rim drop center area 24' to facilitate a more precise mounting for profile sensing device A'.

FIG. 8 shows a slightly modified configuration for the profile sensing device body portion. Here, the body portion has a generally triangular shaped cross-sectional configuration as generally designated 170 which includes a generally smooth mounting surface 172 except for the area of cavity 106'. Here also, the mounting tabs utilized in the preferred arrangement described in detail hereinabove has been replaced by a flexible mounting band 174 which is conveniently received around triangular shaped body portion 170 and the rim drop center area 24'. This band may include a toggle type latch for joining the opposite ends thereof once the band has been placed around the rim and profile sensing device and may further include convenient adjustment means to facilitate the application of proper mounting tension relative to the sensing device.

FIG. 8 also shows the inclusion of a liquid reservoir generally designated 176 which is defined by a hose or other tubular arrangement 178 extending around at least a portion of rim B' in drop center area 24' thereof. This hose or other tubular arrangement includes an opening 180 disposed adjacent body portion 172 which, in turn, receives a frangible type plug member generally designated 182 therein for retaining a fluid inside of the hose. Frangible plug 182 extends outwardly of the rim into the annular tire cavity an extent generally coextensive with the extension of profile sensor 64'. The frangible plug protrudes outwardly of opening 180 such that it too will be engaged by the tire inner wall when an over-profiled tire condition occurs. Upon such engagement, plug 182 is broken off from a plugging relationship with opening 180 to permit the fluid contained in hose or other tubular arrangement 178 to pass therefrom through opening 180 into the annular tire cavity. This fluid may contain a lubricant, a puncture sealing material, a reinflation material or any combination thereof deemed beneficial for protecting the tire when an over-profiled tire condition is present. FIG. 8 is deemed to show that use of this type of fluid reservoir arrangement is entirely compatible with a profile sensing device and a more detailed and complete disclosure for this general type of reservoir arrangement may be found in U.S. Pat. No. 3,942,573.

Figure 9:
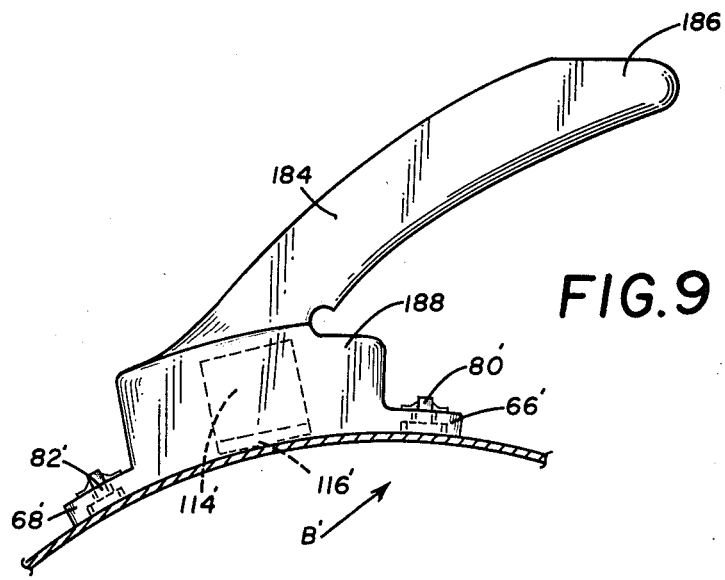
FIG. 9 is a side elevational view showing yet another form for the device of the subject invention.

FIG. 9 shows a further alternative arrangement wherein the profile sensor takes the shape of an elongated arcuate member generally designated 184 having an outermost end 186 which is engaged by the tire when an over-profiled tire condition exists. In this arrangement, arcuate member 184 extends outwardly of a body portion 188 generally coplanar with a plane passing transversely through rim B' as through drop center area 24'. While movement of the profile sensor as shown in FIG. 9 is somewhat different than movement of those profile sensors hereinabove previously described, the operational end result is the same. Because of the specific structural arrangement here employed, this embodiment is uni-directional in operation, i.e., it only operates properly in one direction of rotation of the wheel. For proper operation, the device must be mounted so that outermost end 186 of profile sensor 184 "follows" the rest of the device during wheel rotation. If the outermost end "leads," it will be bent backwardly on itself in the event of tire profile deflection beyond the predetermined maximum amount. Moreover, and unless appropriate structural rigidity is provided, centrifugal forces generated during wheel rotation can cause profile sensor 184 to be biased outwardly toward the tire wall thereby causing an undesired flexure in the piezoelectric generator. It is also possible, however, to structurally modify the arrangement of FIG. 9 to render it bi-directional.

Figure 10:
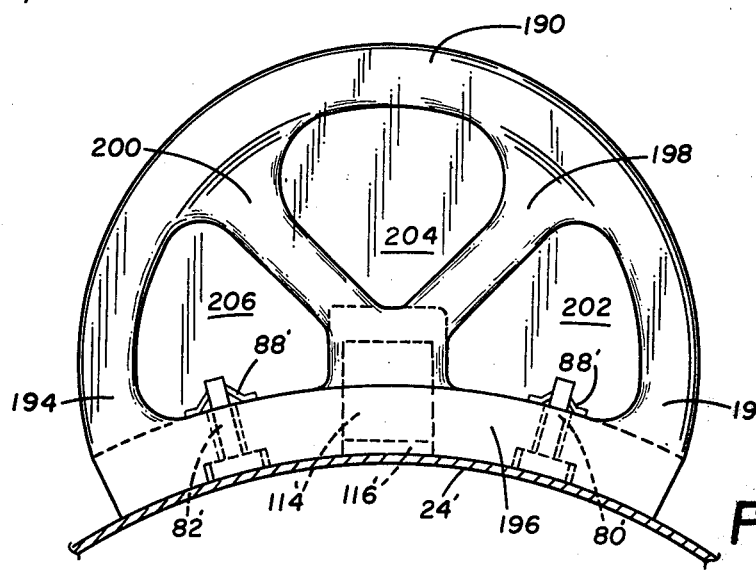
FIG. 10 is a side elevational view showing a still further alternative for the device of the subject invention; and, FIG. 11 is a generally schematic view showing the overall preferred operational arrangement for the new device and method.

Finally, FIG. 10 shows a still further modification to the profile sensor wherein the arcuate shaped rib or connecting member 190 has a substantially semi-circular configuration. End portions 192, 194 of member 190 are affixed to a body portion generally designated 196 adjacent the longitudinal spaced apart ends thereof. Supporting legs 198, 200 diverge outwardly of each other from body portion 196 to rib or connecting member 190, with web areas 202, 204 and 206 included between the body portion and legs. Similar to the other profile sensor configuration described above, the profile sensor shown in FIG. 10 is disposed symmetrically about plane b'.

While FIGS. 7-10 show some of the various modifications which could be made when practicing the concepts of the subject invention, these modifications are by no means deemed to be inclusive. For example, it is entirely possible to construct the sensing device body portion and profile sensor as separate components and/or to construct them so as to cooperate with a piezoelectric generator in a different manner than that described hereinabove in detail. In this regard, it would be possible to pivotally mount the profile sensor to the sensing device body portion and include a cam or other engaging surface on the lowermost end of the profile sensor to engage and cause a discharge in a piezoelectric generator in response to some preselected profile condition in a hollow body. Moreover, many types or styles of piezoelectric generators other than the unimorph type specifically described hereinabove could be adapted for use in the subject device and other types and styles of linkage arrangements could be substituted for the specific profile sensors disclosed in detail hereinabove. Finally, and while the preferred and alternative arrangements of the profile sensing device have been shown and described as being mounted interiorly a vehicle wheel assembly, it would also be possible in this environment to adapt and mount the device exteriorly of the wheel assembly, including the chassis, the springs and the like so that a mechanical linkage will be engaged when some profile deflection reaches a predetermined amount for causing a discharge in a piezoelectric generator. None of these various possible alterations and modifications are deemed to in any way depart from the overall intent or scope of the subject application.

While the present invention is particularly applicable to use in detecting and indicating overloading and/or under inflation for conventional vehicle wheels by sensing tire profile deflection greater than a predetermined allowable amount, it may be readily adapted to and used for other applications when it is desired to continuously monitor the profile condition in some load bearing body and then provide an indicator or warning when this condition reaches some predetermined unacceptable level. Moreover, and while the preferred use of the subject invention is for energizing a radio transmitter for transmitting signals to a receiver spaced some distance from the body being monitored, it would also be possible to replace the transmitter with other circuitry for performing other types of indicating or working functions. All of these various above noted modifications are considered to fall within the scope and intent of the present invention.

The invention has been described with reference to a preferred and alternative embodiments. Obviously, modifications and alterations will occur to others upon the reading and understanding of this specification. It is our intention to include all such modifications and alterations insofar as they come within the scope of the appended claims or the equivalents thereof.

Having thus described our invention, we now claim:

1. Apparatus for sensing the profile condition of a conventional vehicle wheel assembly having an axis of rotation comprised of a rim having an outer peripheral surface with outwardly extending radial flanges at the opposed side edges thereof and a pneumatic tire having an annular road-engaging tread surface with side wall portions at the side edges thereof defining a generally annular tire cavity with said tire adapted to be mounted on said rim and inflated to a predetermined pressure for supporting a vehicle with a predetermined maximum allowable tire profile deflection, said apparatus comprising:

a sensing and actuating structure adapted to be operably mounted within said annular tire cavity including a body portion and a linkage portion comprising a flexible profile sensor having high flexfatigue characteristics, said linkage portion having a first normal position spaced from said tire when said tire profile deflection is less than said predetermined maximum and a second flexibly deflected position when said tire profile deflection is greater than said predetermined maximum, said linkage portion being forcibly moved from said first toward said second position by positive contact from said tire;

energizing means comprising a piezoelectric generator associated with said body portion which is selectively movable between energizing and non-energizing conditions, said energizing means being in said non-energizing condition when said linkage is in said first normal position and being moved into said energizing condition as said linkage is moved toward said second position; and, means responsive to said energizing means for indicating that said tire has a profile deflection greater than said predetermined maximum allowable deflection.

2. The apparatus as defined in claim 1 wherein said profile sensor and body portion are integrally formed with each other.

3. The apparatus as defined in claim 2 wherein said flexible profile sensor in said first normal position is disposed at an acute angle to a plane passing through said wheel assembly perpendicular to the axis of rotation so as to be deflected rather than compressed when said sensor is in said second position.

4. The apparatus as defined in claim 1 wherein said sensing and actuating structure is adapted to be mounted on said rim outer peripheral surface between said flanges so as to extend radially outward thereof toward said tire cavity and said body portion includes a mounting surface facing said rim outer peripheral surface with said linkage portion extending outwardly of said body portion further toward said tire cavity, said body portion mounting surface being forced toward close forced contact with said rim outer peripheral surface in response to movement of said linkage portion from said first toward said second position by engagement from the inside wall of said tire when said tire has a deflection greater than said predetermined maximum.

5. The apparatus as defined in claim 4 wherein said sensing and actuating structure body portion includes a cavity extending inwardly from said mounting surface, said responsive means and piezoelectric generator being received in said cavity with said piezoelectric generator being operably disposed relative to said rim outer surface such that movement of said mounting surface toward close forced contact with said rim outer peripheral surface causes a flexure in said piezoelectric generator to generate an electrical impulse for operating said responsive means.

6. The apparatus as defined in claim 4 wherein said rim outer peripheral surface includes an annular drop center area, said sensing and actuating structure body portion being configured to be received in said drop center area.

7. The apparatus as defined in claim 4 further including a fluid reservoir for selectively releasing a supply of fluid into said tire cavity in response to said tire having a profile deflection greater than said predetermined maximum allowable deflection.

* * * * *